(12) United States Patent
Bartz et al.

(10) Patent No.: US 10,358,286 B2
(45) Date of Patent: Jul. 23, 2019

(54) OVERFILL AND FLUID LEVEL INDICATORS FOR USE ON FLEXIBLE COLLAPSIBLE LIQUID TANKS

(71) Applicant: DONMARK HOLDINGS INC., Delta (CA)

(72) Inventors: George Bartz, Delta (CA); Victor Yaremenko, Delta (CA); Jennifer Chi, Delta (CA); Paul Reichard, Delta (CA)

(*) Notice: Subject to any disclaimer, the term of this patent is extended or adjusted under 35 U.S.C. 154(b) by 157 days.

(21) Appl. No.: 15/362,164

(22) Filed: Nov. 28, 2016

(65) Prior Publication Data

US 2017/0152103 A1 Jun. 1, 2017

Related U.S. Application Data

(60) Provisional application No. 62/260,289, filed on Nov. 26, 2015.

(51) Int. Cl.
| | |
|---|---|
| *B65D 88/16* | (2006.01) |
| *B65D 90/02* | (2019.01) |
| *B65D 90/26* | (2006.01) |
| *B65D 90/34* | (2006.01) |
| *B65D 90/48* | (2006.01) |
| *G01F 23/00* | (2006.01) |
| *G01F 23/22* | (2006.01) |
| *G08B 21/00* | (2006.01) |

(52) U.S. Cl.
CPC ............ *B65D 90/48* (2013.01); *B65D 88/16* (2013.01); *B65D 90/02* (2013.01); *B65D 90/26* (2013.01); *B65D 90/34* (2013.01); *G01F 23/00* (2013.01); *G01F 23/0007* (2013.01); *G01F 23/22* (2013.01); *G08B 21/00* (2013.01); *G01F 23/0023* (2013.01)

(58) Field of Classification Search
CPC ........ B65D 90/48; B65D 90/02; B65D 90/26; B65D 90/34; B65D 88/16; G01F 23/00; G01F 23/0007; G01F 23/22; G01F 23/0023; G08B 21/00
USPC .................................. 116/203, 209–216, 227
See application file for complete search history.

(56) References Cited

U.S. PATENT DOCUMENTS

| | | | | |
|---|---|---|---|---|
| 4,972 | A * | 2/1847 | Baker ................... | G01F 23/284 73/290 R |
| 137,097 | A * | 3/1873 | Ross ...................... | G01F 23/30 73/307 |
| 740,516 | A * | 10/1903 | Bessette .................. | F25D 21/14 116/111 |

(Continued)

*Primary Examiner* — Justin Seo
*Assistant Examiner* — Tania C Courson

(57) ABSTRACT

An overfill indicator for a flexible collapsible liquid storage tank made of a liquid impervious fabric and having a floor and a top wall with a vent therein, the overfill indicator comprising a connector portion adapted to removably connecting to the vent of the tank, an indicator movably mounted to the connector portion, the indicator being moveable between a resting position and a visually noticeable alert position, a base portion located on the inside of the tank and on the floor thereof and aligned with the vent, and a linkage connecting the base to the indicator such that the indicator is moved from the resting position to the alert position as the top wall of the tank reaches a threshold distance from the floor as the tank is filled with liquid, wherein said threshold distance coincides with the tank having reached a desired liquid capacity.

4 Claims, 6 Drawing Sheets

(56) References Cited

U.S. PATENT DOCUMENTS

| | | | | |
|---|---|---|---|---|
| 1,617,110 A | * | 2/1927 | Havlicek | G01F 23/34 116/227 |
| 1,676,565 A | * | 7/1928 | Valle et al. | F25D 21/14 116/110 |
| 1,801,580 A | * | 4/1931 | Wiggins | B65D 90/34 137/587 |
| 2,029,405 A | * | 2/1936 | Beadle | G01F 23/58 137/558 |
| 2,038,273 A | * | 4/1936 | Eynon | G01F 23/0038 73/309 |
| 2,282,774 A | * | 5/1942 | Wiggins | G01F 23/0023 33/719 |
| 2,382,377 A | * | 8/1945 | Blake | G01F 23/0023 24/115 G |
| 2,463,304 A | * | 3/1949 | Pick | C02F 1/42 116/303 |
| 2,614,578 A | * | 10/1952 | Stickney | G01F 1/52 137/391 |
| 2,732,873 A | * | 1/1956 | Treiber | B65D 90/48 116/270 |
| 2,740,371 A | * | 4/1956 | Nelson | A01G 29/00 116/227 |
| 2,855,966 A | * | 10/1958 | Lewis | B65D 90/205 220/565 |
| 2,874,574 A | * | 2/1959 | Patureau | G01F 23/263 73/321 |
| 2,957,283 A | * | 10/1960 | Mitchell | B65D 88/1637 134/22.1 |
| 3,545,272 A | * | 12/1970 | McGill | G01F 23/36 340/623 |
| 4,188,726 A | * | 2/1980 | Wemyss | G01F 23/00 33/715 |
| 4,230,312 A | * | 10/1980 | Templeton | B65H 43/06 271/215 |
| 4,300,388 A | * | 11/1981 | Hansel | G01F 23/0023 73/49.2 |
| 4,667,711 A | * | 5/1987 | Draft | F16K 21/18 137/448 |
| 4,762,000 A | * | 8/1988 | Bond, Jr. | G01F 23/0046 116/227 |
| 4,986,320 A | * | 1/1991 | Kesterman | B65D 90/26 137/411 |
| 5,152,315 A | * | 10/1992 | Lagache | B67D 7/365 137/434 |
| 5,163,470 A | * | 11/1992 | Maeshiba | B65D 90/26 137/434 |
| 5,425,329 A | * | 6/1995 | Pollock | G01F 23/0023 116/201 |
| 5,947,372 A | * | 9/1999 | Tiernan | G01F 23/34 116/227 |
| 6,003,366 A | * | 12/1999 | McGookin | G01F 23/0023 73/296 |
| 6,679,122 B2 | * | 1/2004 | Blake | G01L 7/043 73/430 |
| 6,732,580 B2 | * | 5/2004 | Dirksen | G01F 23/0023 73/149 |
| 7,044,077 B1 | * | 5/2006 | Currie | G01F 23/34 116/109 |
| 7,168,313 B2 | * | 1/2007 | Reinis | G01F 23/0023 73/290 R |
| 7,222,529 B2 | * | 5/2007 | Pauer | G01F 23/36 116/227 |
| 7,880,625 B2 | * | 2/2011 | Almoumen | G01F 23/0023 340/623 |
| 9,177,461 B2 | * | 11/2015 | Middleton | G08B 21/182 |

* cited by examiner

FLAG UP VIEW

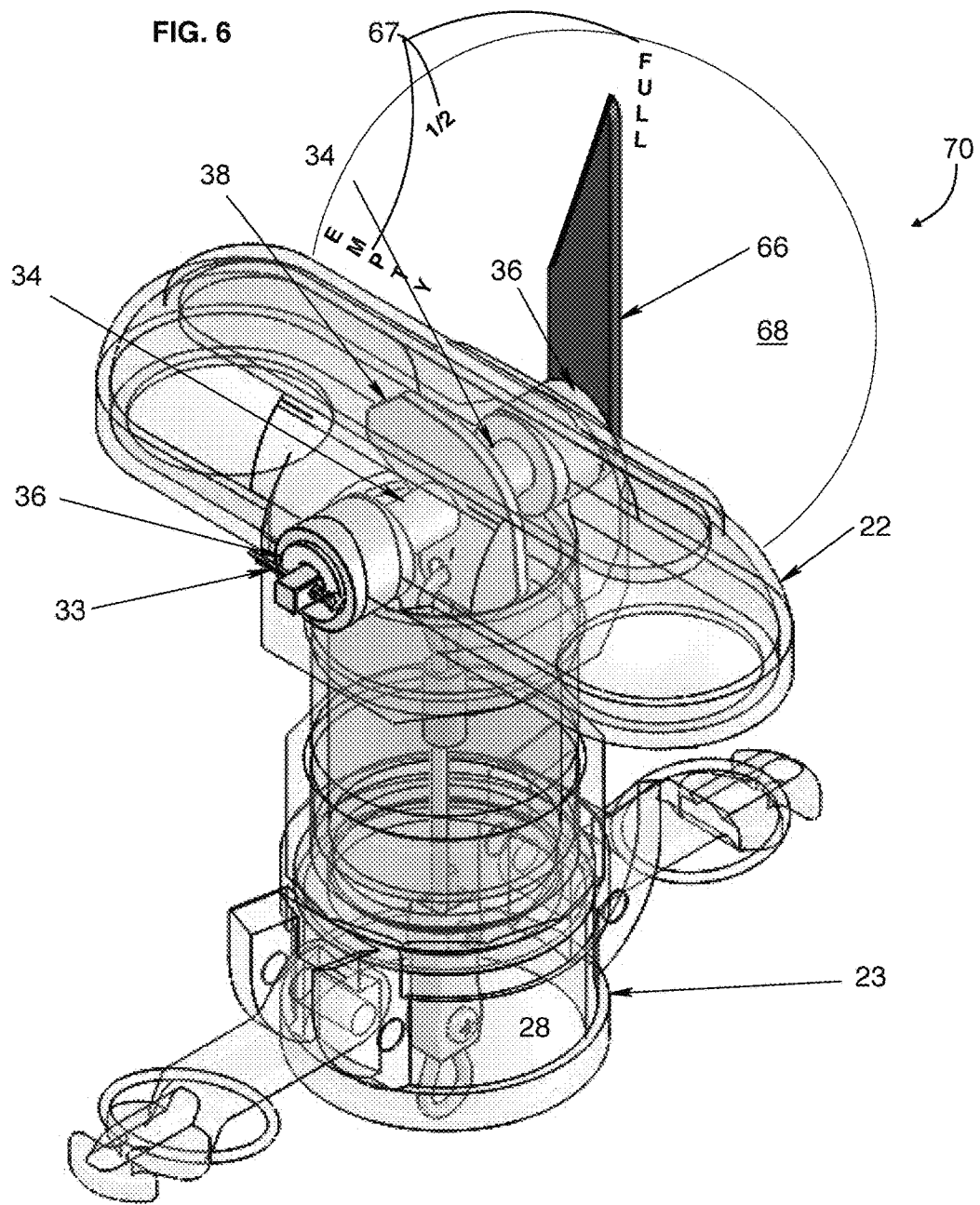

OVERFILL AND FLUID LEVEL INDICATORS FOR USE ON FLEXIBLE COLLAPSIBLE LIQUID TANKS

BACKGROUND OF THE INVENTION

Field of Invention

The present invention generally relates to flexible tanks for liquids commonly known as collapsible tanks or pillow tanks. These are tanks made of a fluid resistant fabric that may be rolled or folded for transport, and when in use they may be unrolled and filled with liquid. The present invention relates to an overfill indicator for flexible collapsible tanks, and to a liquid fill level indicator for flexible collapsible tanks.

Description of Related Art

Flexible collapsible liquid tanks are used for the handling, storage and transportation of large volumes of liquids such as water or fuel. These tanks are commonly referred to as pillow tanks in the industry, and are typically made of a flexible fiber reinforced elastomeric material. They have inlets or nozzles for filling and draining purposes, as well as vents disposed on the top surface of the tank to allow the escape of air and other gasses during filling. A principal advantage to such flexible collapsible liquid containers is that they are relatively lightweight and compact when empty since they do not have a frame or rigid supports. The flexible and collapsible bladder is designed to contain the liquid; hence it is designed to be in constant contact with the liquid. The liquid may be a hydrocarbon fuel, in which case the material is made from a fabric that is compatible for use with hydrocarbon fuels. Such material is well known in the art of pillow tanks designed for hydrocarbon fuel storage. Examples include a heavy duty urethane coated fabric. Most large pillow tanks have one or two fill and drain ports to facilitate filling and discharging of liquid, as well as one or more vents (or flame arrestor vents in the case of fuel transport tanks) on the top wall of the tank. Some examples of flexible collapsible liquid tanks include those manufactured by SEI Industries Ltd. of Delta, Canada, and sold under the trademarks TERRA TANK™, ARCTIC KING™, DESERT KING™ and JUNGLE KING™.

Since collapsible pillow tanks do not have a fixed shape, it has caused challenges to the effective monitoring of the liquid volume inside. The hyper-elastic nature of the tank allows operators to easily overfill them without noticing the overfill condition. This can lead to stresses being put on seams in the tank, which over time can lead to tank failure.

There are methods and devices that have been used to date to monitor the amount of liquid inside large collapsible pillow tanks, but these have not worked well for various reasons. For example, one method involves metering the volume of liquid inflow into the tank and keeping records of the total volume of liquid put into the tank, attempting to ensure that the volume going into the tank is below the manufacturer's stated maximum capacity of the tank. However, this method often fails in the field due to poor record keeping of the amount of liquid going in and out of the tank.

Another method involves installing a pressure sensor on the bottom or floor of the tank for monitoring the hydrostatic head pressure of the liquid from which is calculated the volume of liquid in the tank. This method, while accurate, is expensive and the experience has been that the system for measuring tank volume in this way is rarely purchased by customers because of the costs.

Yet another method involves the use of an external measurement system comprising two sticks and a string across the highest point of the tank from which the height of the tank may be observed. This method is cumbersome for operators in the field and often results in poor readings because the distance between the two sticks is so great on large tanks and the string often sags.

Accordingly, there is a need for simple, cost effective and reliable overflow indicator devices or liquid level indicator devices for use on large flexible collapsible liquid tanks, also known as pillow tanks.

SUMMARY OF THE INVENTION

The present invention provides easy to use visual overfill indicator devices and liquid level indicator devices for use with flexible pillow tanks. The devices work by raising a flag or pointer that is carried on the vent mechanism and that is mechanically linked to or associated with the inside bottom wall or floor of the pillow tank. The overflow indicator or liquid level indicator is calibrated to the tank height at the factory by installing a predetermined length of line or fabric strip. The line or fabric strip is secured at the center point of the tank, which will be the highest point on the tank. As the top of the tank rises, the resulting tension on the line causes the flag or indicator to rise. These embodiments of the devices do not provide an exact total volume in the tank, but rather they provide either a visible overfill warning or a rough approximation of liquid volume to an operator. The present invention provides simple and low cost solutions that require no power or record keeping.

In some embodiments, the present invention provides an overfill indicator for a flexible collapsible liquid storage tank made of a liquid impervious fabric and having a floor and a top wall with a vent therein, the overfill indicator comprising: a connector portion adapted to removably connect to the vent of the tank; an indicator movably mounted to the connector portion, the indicator being moveable between a resting position and a visually noticeable alert position; a base portion located on the inside of the tank and on the floor thereof and aligned with the vent; and a linkage connecting the base portion to the indicator such that the indicator is moved from the resting position to the alert position as the top wall of the tank reaches a threshold distance from the floor as the tank is filled with liquid, wherein said threshold distance coincides with the tank having reached a desired liquid capacity.

In some embodiments, the base portion may comprise a weight dimensioned to being inserted into the tank through the vent and having a mass sufficient to maintain the base on the floor of the tank. In some embodiments, the base may be connected to the floor of the tank.

In some embodiments, the linkage may comprise a flexible line of a predetermined length that becomes taut as the tank reaches the desired liquid capacity to cause the indicator to move into the alert position.

In some embodiments, the vent on the tank defines a tubular outlet and the connector portion may comprise a tubular body that mates with the outlet on the vent to removably connect the tubular body to the vent.

In some embodiments, the indicator may be journaled for rotation on an axle extending across the tubular body, the indicator further includes a lever arm by which the indicator is rotated between the resting position and the alert position, and the linkage extends through the tubular body and is connected to the lever arm of the indicator.

In some embodiments, the linkage may comprise a fixed section that is connected to the lever arm and extends to a bottom of the tubular body, a flexible line section that is releasably connected to the fixed section, and the flexible line is of a predetermined length that becomes taut as the tank reaches the predetermined liquid capacity to cause the indicator to rotate into the alert position.

In some embodiments the present invention provides a fluid level indicator for a flexible collapsible liquid storage tank made of a liquid impervious fabric and having a floor and a top wall with a vent therein, the fluid level indicator comprising: a connector portion adapted to removably connecting to the vent of the tank; an indicator rotatably mounted to the connector portion, the indicator being rotatable between a first position and a second position; a base portion located on the inside of the tank and on the floor thereof and aligned with the vent; a linkage connecting the base portion to the indicator such that the indicator is rotated from the first position toward the second position as the top wall of the tank rises from the floor as the tank is filled with liquid; and a card having liquid level indicia marked thereon to which the indicator points as it rotates from the first position to the second position, said indicia being calibrated to coincide with predetermined liquid capacities of the tank.

In some embodiments, the base portion may comprise a weight dimensioned to being inserted into the tank through the vent and having a mass sufficient to maintain the base portion on the floor of the tank. In some embodiments, the base portion may be connected to the floor of the tank.

In some embodiments, the linkage may comprise a flexible line of a predetermined length that becomes fully taut as the tank reaches its full liquid capacity to cause the indicator to rotate to the second position.

In some embodiments, the vent on the tank defines a tubular outlet and the connector portion may comprise a tubular body that mates with the outlet on the vent to removably connect the tubular body to the vent.

In some embodiments, the indicator may be journaled for rotation on an axle extending across the tubular body, the indicator further includes a lever arm by which the indicator is rotated, and the linkage extends through the tubular body and is connected to the lever arm of the indicator.

In some embodiments, the linkage may comprise a fixed section that is connected to the lever arm and extends to a bottom of the tubular body, a flexible line section that is releasably connected to the fixed section, and the flexible line is of a predetermined length that becomes fully taut as the tank reaches its full liquid capacity to cause the indicator to rotate into the second position.

Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention:

FIG. 6 is a close up perspective view of an embodiment of a vent and liquid level indicator device showing a full indication, with the outer portions of the vent shown translucent to expose the inner mechanism of the liquid level indicator device.

DETAILED DESCRIPTION

Figure 1:
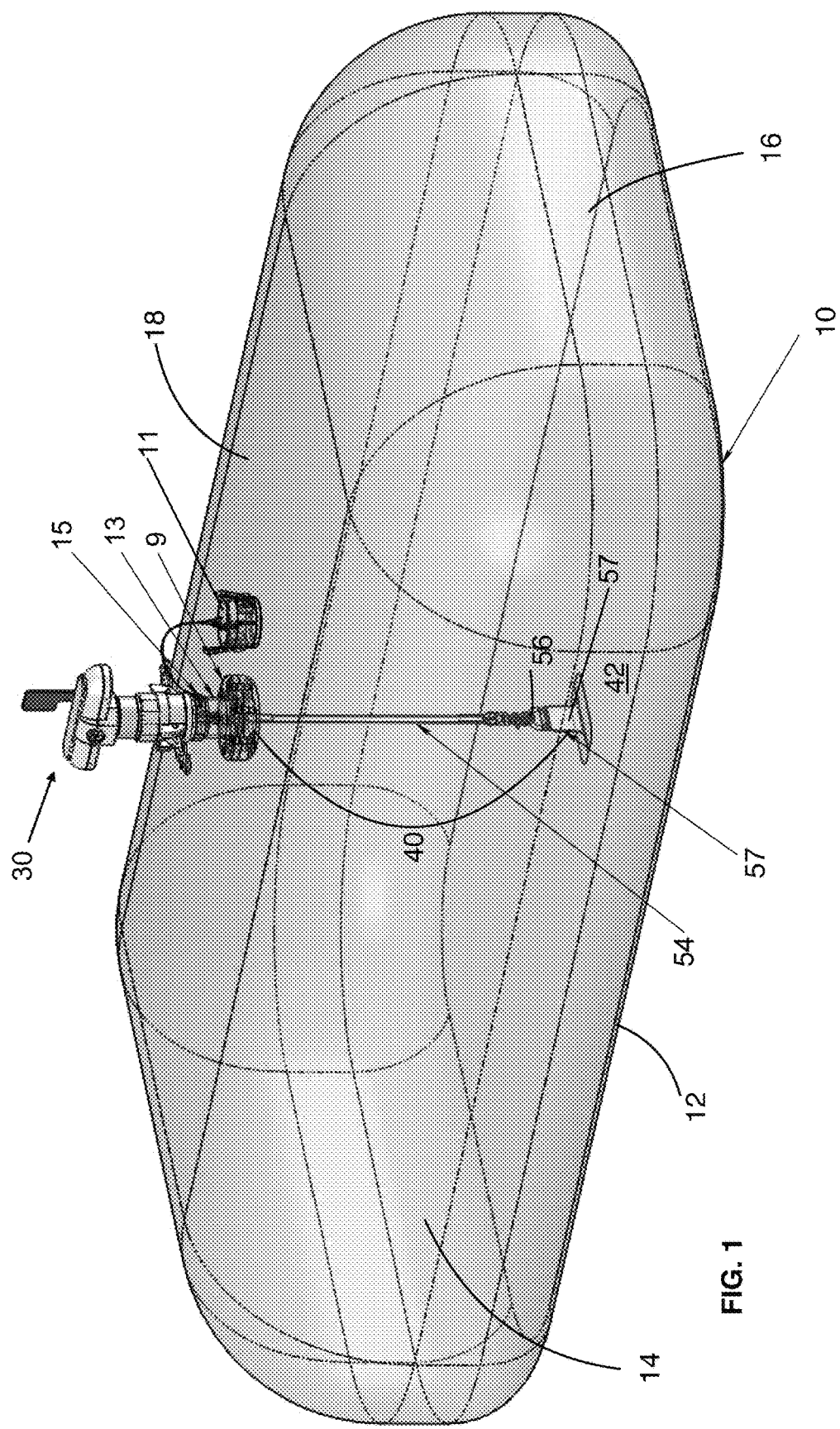
FIG. 1 is a perspective view of a flexible bladder tank having an overfill indicator device according to an embodiment of the present invention.

Referring to FIG. 1, there is shown a flexible collapsible tank or pillow tank 10 for the storage and transport of liquids. The tank 10 is made of liquid impervious fabric material that is known in the art and comprises a plurality of panels that are welded together by known techniques to define a generally rectangular tank having a bottom wall or floor 12, side and end walls 14 and 16 respectively, and a top wall 18. The overall shape and size of the tanks may vary. In the top wall 18 of the tank is provided a vent 13. Typically a vent opening is provided in the center of the top wall 18 of the tank (as illustrated) since that is usually the highest point when filling and towards which trapped gasses (air) are urged so that said gases exit the vent. A vent 13 on the top wall of the tank typically comprises a base portion 9 to mount the vent 13 onto the material of the tank, and a connector portion 15 by which a vent cap 11 is removably secured to the vent 13.

Figure 2:
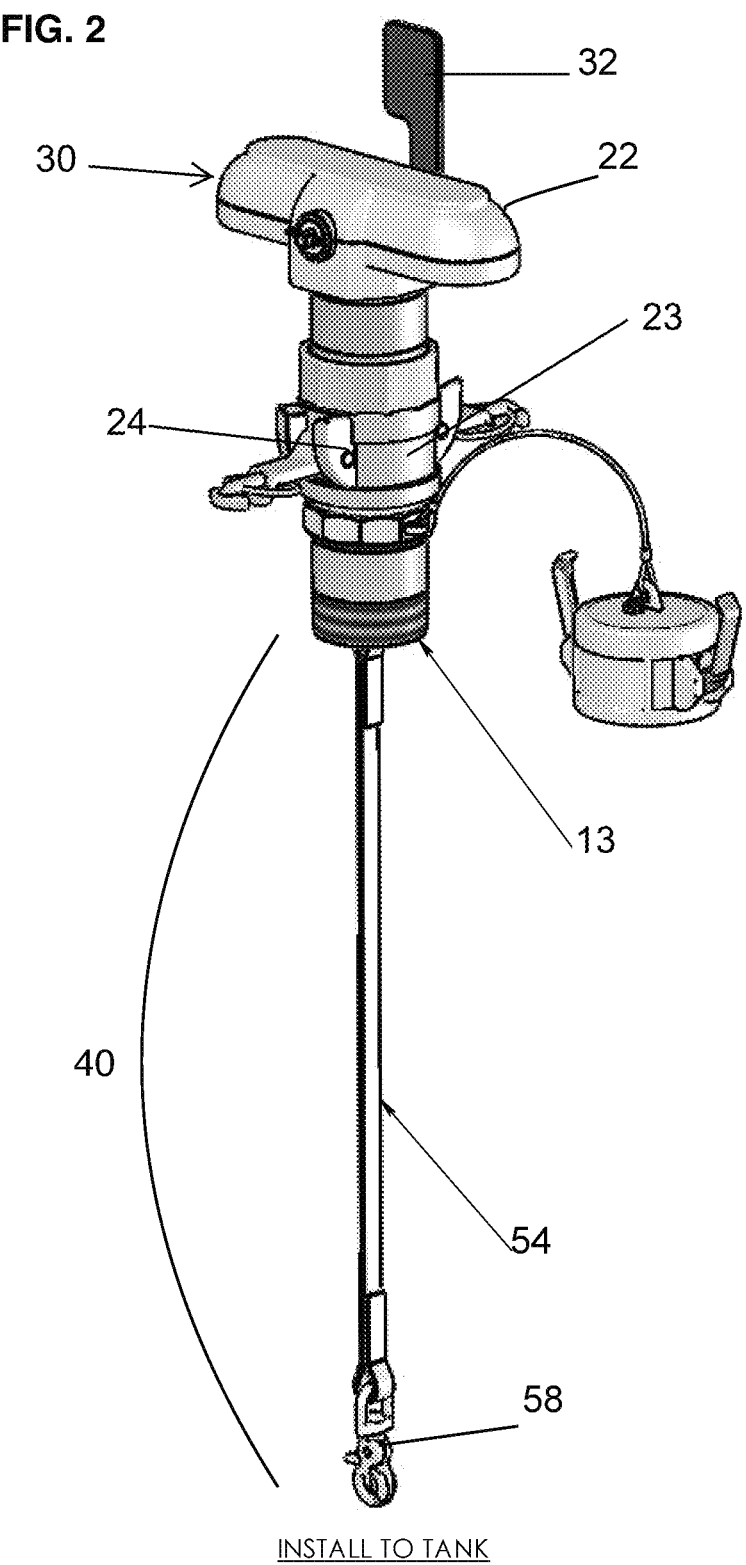
FIG. 2 is a perspective view of the isolated vent and overfill indicator device of FIG. 1.
Figure 3:
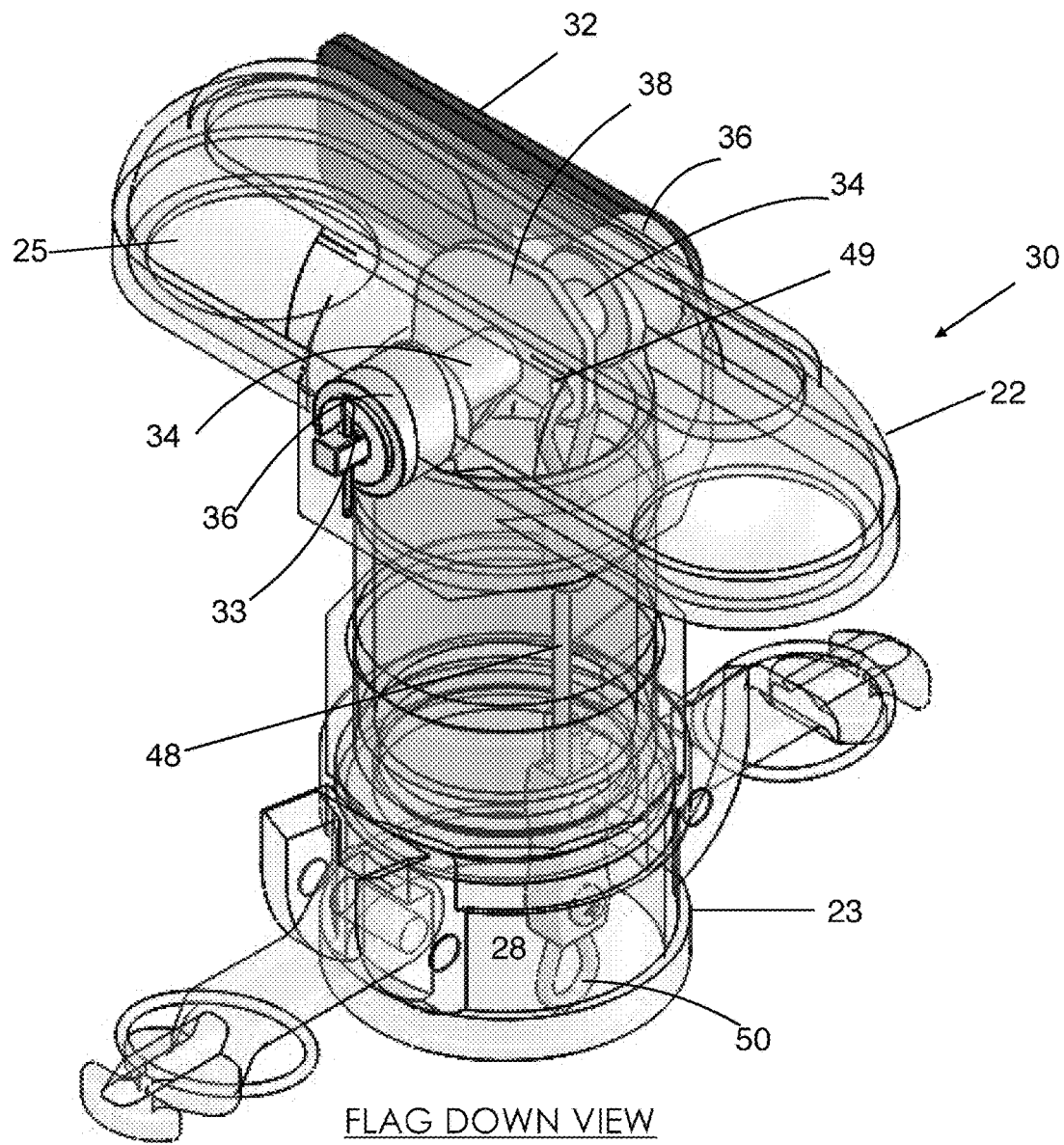
FIG. 3 is a close up perspective view of the vent and overfill indicator device of FIG. 1 in a down position with the outer portions of the vent shown translucent to expose the inner mechanism of the overfill indicator device.
Figure 4:
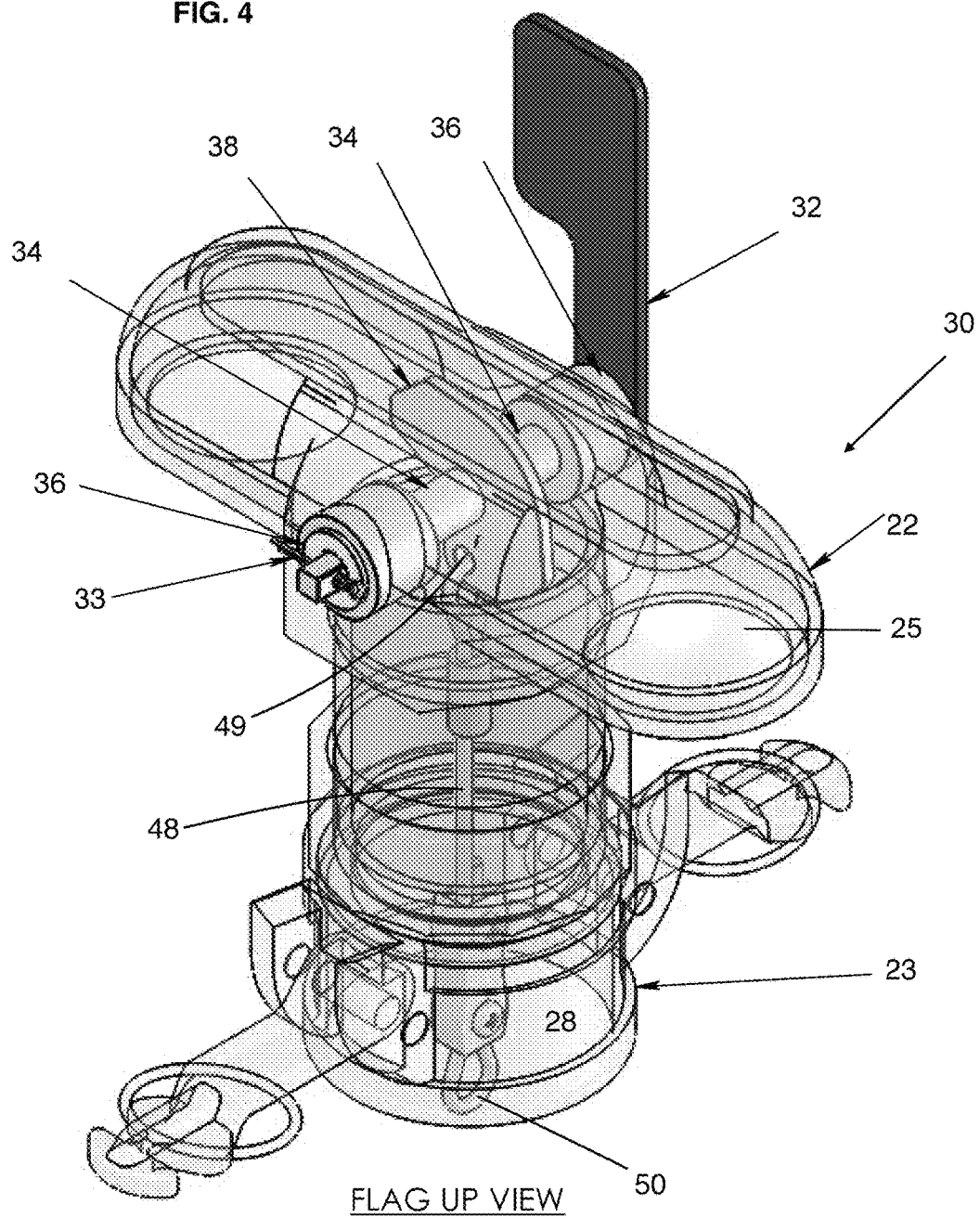
FIG. 4 is a close up perspective view of the vent and overfill indicator device of FIG. 1 in an up position with the outer portions of the vent shown translucent to expose the inner mechanism of the overfill indicator device.

As best shown in to FIGS. 2-3, the overflow indicator device 30 comprises a removable vent apparatus 22 having a connector portion such as tubular body or portion 23 with a connector 24 that is complementary with and removably connects with the vent connector portion 15 on the vent 13. The specific structure of the vent apparatus 22 may vary, but common features include a central cavity 28 that is in fluid communication with the interior of the tank 10 to enable gases from the tank to vent to the environment such as via ports 25. A visual indicator or flag 32 is moveable, such as for example journaled for rotation relative to the vent apparatus 22. In the illustrated embodiment, the flag 32 is connected to an axle 34 that spans the central cavity 28 of the tubular portion and is received within bushings or bearings 36 at each end. The terminal end of the axle is secured with a cotter pin arrangement 33. Thus, the axle 34 rotates within the bearings 36, and the flag is thus rotatable relative to the vent apparatus 22 between a resting down position (shown in FIG. 3) and a visually noticeable alert or up position (shown in FIG. 4). A lever arm such as arm 38 is connected to the axle 34 and, by virtue of several linkages 40, to the inside surface 42 of bottom wall 12 of the tank at a location that is aligned with the vent opening of the tank 10. As the tank fills with liquid, the top wall 18 rises relative to the bottom wall 12, and eventually the linkages 40 become taut and cause the arm 38 to rotate the axle 34 and the flag 32, from the down position to the up position. The overall length of the linkages 40 is predetermined and set for each size model of the tank 10 such that the linkages 40 become taut at a distance between the top wall 18 and the bottom wall 12, hence at a specific liquid volume, that is determined to be near the optimal or maximum fluid capacity of the tank. Hence, the flag 32 will be rotated to the up position at said fluid capacity, thereby providing a clear visual signal to an operator to discontinue filling the tank.

In the illustrated embodiment, the linkages 40 comprise a short fixed section such as cable portion 48, a D-ring 56 connected to a base portion such as fabric piece 57 that is welded to the inside surface 42 of the bottom wall 12, and a flexible strip of tank fabric material, cable or line 54 that extends from the D-ring 56 to the cable portion 48. The fabric piece 57 functions as a base portion located on the inside of the tank and on the floor thereof and aligned with the vent.

The cable portion 48 at its upper end is looped through a hole 49 in the arm 38 that is offset from the axle 34. The bottom end of the cable 48 is also provided with a loop 50. The flexible strip 54 is preferably removably connected to the loop 50 of cable portion 48, the D-ring 56 or both, by releasable clip connectors 58 (or similar mechanisms) to facilitate the removal of the vent apparatus 22 from the tank 10 as necessary or desired. In this embodiment of the linkages 40, the status of the indicator flag 32 may be calibrated to a specific size model of tank by predetermining the length of the flexible strip 54 that will cause the linkages 40 to go taut at a desired volume fill level of the tank, Variations of the components of the linkages 40 are contemplated, and in some embodiments, the entire linkage may comprise simply of a fabric strip, cable or line attached directly to the bottom of the tank and the arm 38.

Several other configurations are possible. For example, the vent with flag device for use as an overfill alarm may be sold with a new collapsible tank. The tank will have a fabric tab 57 with a D-ring 56 welded to the bottom of the tank on the inside to connect to a fabric strip or fuel resistant cable that will attach to the flag mechanism on the vent. The fabric strip or cable length will be determined by the shape and size of the tank.

Figure 5:
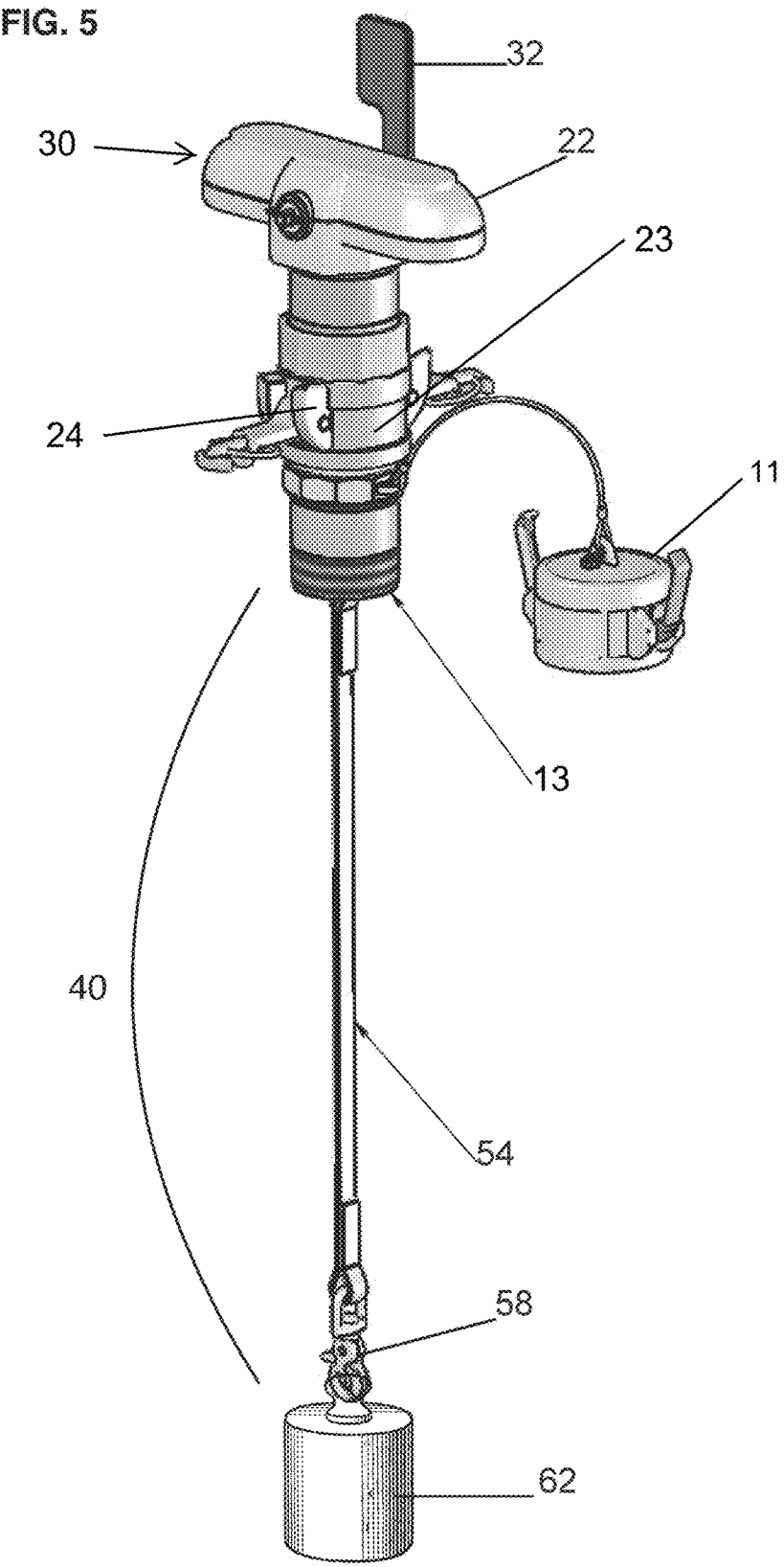
FIG. 5 is a perspective view of another embodiment of an isolated vent and overfill indicator device.

Referring to FIG. 5, another configuration may be a retrofit for existing tanks. The vent with flag used as an overfill alarm may be sold as an after market accessory and may be installed on an existing collapsible tank. A weight 62 with a D-ring welded onto it may be installed into the tank through the vent opening and will sink to the bottom of the tank and thereby function as a base portion located on the inside of the tank and on the floor thereof and aligned with the vent. The weight is of sufficient mass to prevent it from significantly moving around inside the tank and provide the requisite tension on the linkage. A fabric strip or fuel resistant cable may attach to the flag mechanism on the vent and to the weight 62. The fabric strip or cable length will be determined by the shape and size of the tank. The cable or fabric strip may be adjustable to accommodate different tanks.

In some embodiments, the flag may be biased towards the down position by means of a spring or other suitable mechanism acting on the flag, axle or arm, and the biasing force is released or overcome by the force applied by the linkage to the arm.

Referring to FIG. 6, a further configuration is shown as a liquid level indicator 70 that provides a more specific indication of the liquid level in the tank. In this case the flag is replaced with a smaller but simple indicator or pointer 66 that travels over a separate back plate or card 68 having volume level indicia such as indications 67 marked thereon to show the operator the liquid fill level in the tank. For example, the indications 67 may be "Empty, ¼, ½, ¾ and Full", but other ways to demonstrate the liquid level in the tank may likewise be used, such as for example a numerical scale. The position of the indications 67 on the back plate 68 and the length of the line 54 are calibrated so that together they show the liquid levels in the specific size model of tank. A liquid level indicator may also be configured as a retrofit accessory utilizing a weight 62 rather than being fixed to the bottom of the tank. In some embodiments, the pointer may be biased towards the empty indication by means of a spring or other suitable mechanism acting on the pointer, axle or arm, and the biasing force is overcome by the force applied by the linkage to the arm.

While the above description and illustrations constitute preferred or alternate embodiments of the present invention, it will be appreciated that numerous variations may be made without departing from the scope of the invention. Thus, the embodiments described and illustrated herein should not be considered to limit the invention as construed in accordance with the accompanying claims.

The invention claimed is:

1. An overfill indicator for a flexible collapsible liquid storage tank made of a liquid impervious fabric and having a floor and a top wall with a vent opening therein, the overfill indicator comprising:
   a vent cap adapted to releasably connect with the vent opening on the top wall of the flexible collapsible liquid storage tank, the vent cap having a tubular body that mates with the vent opening and is open to the inside of the tank;
   an indicator mounted to the vent cap, the indicator being moveable between a resting position and a visually noticeable alert position, and having a lever arm located within the tubular body;
   a base portion on the inside of the tank that is attached to the floor of the tank at a location that is coaxially aligned with the vent opening when the tank is at a maximum liquid capacity; and
   a linkage connecting the base portion to the lever arm of the indicator, the linkage having a length calibrated to move the indicator from the resting position to the alert position as the top wall of the tank reaches a threshold distance from the floor as a result of the liquid in the tank, wherein said threshold distance coincides with the tank having reached a maximum liquid capacity.

2. The apparatus as claimed in claim 1 wherein the linkage comprises a flexible line of a predetermined length that becomes taut when the tank reaches the maximum liquid capacity thereby moving the indicator into the alert position.

3. The apparatus as claimed in claim 2 wherein the indicator includes an axle extending across the tubular body, and the lever arm is connected to the axle in a manner to rotate the indicator from the resting position to the alert position upon being actuated by the taut linkage.

4. The apparatus as claimed in claim 3 wherein the linkage comprises a fixed section that is connected to the lever arm and extends to a bottom of the tubular body, a flexible line that is releasably connected to the fixed section, and the flexible line is of a predetermined length that becomes taut when the tank reaches the maximum liquid capacity thereby moving the indicator into the alert position.

* * * * *